United States Patent [19]

Folsom

[11] 4,001,881
[45] Jan. 4, 1977

[54] SWITCHED VIDEO RECORDING SYSTEM
[75] Inventor: David A. Folsom, Sudbury, Mass.
[73] Assignee: QSI Systems, Inc., West Newton, Mass.
[22] Filed: Jan. 2, 1975
[21] Appl. No.: 538,006
[52] U.S. Cl. .................................. 360/5; 360/35
[51] Int. Cl.$^2$ ..................................... H04N 5/785
[58] Field of Search ............. 178/DIG. 23, DIG. 38; 340/413; 360/5, 33, 35, 36, 70

[56] References Cited
UNITED STATES PATENTS

| | | | |
|---|---|---|---|
| 3,493,676 | 2/1970 | Guerin | 360/33 |
| 3,532,974 | 10/1970 | Lemoine | 360/33 |
| 3,686,434 | 8/1972 | Lemelson | 178/DIG. 38 |

Primary Examiner—Jay P. Lucas
Attorney, Agent, or Firm—Cesari and McKenna

[57] ABSTRACT

A video surveillance system which records the outputs of a plurality of video cameras in sequence normally operates in a time lapse mode so that video signals are recorded at spaced intervals of time to conserve video recording tape. When an emergency situation occurs in the installation being surveilled, an alarm button is depressed which automatically switches the system into a real time mode in which the video signals are recorded continuously so that there is no loss of useful information during the emergency.

6 Claims, 1 Drawing Figure

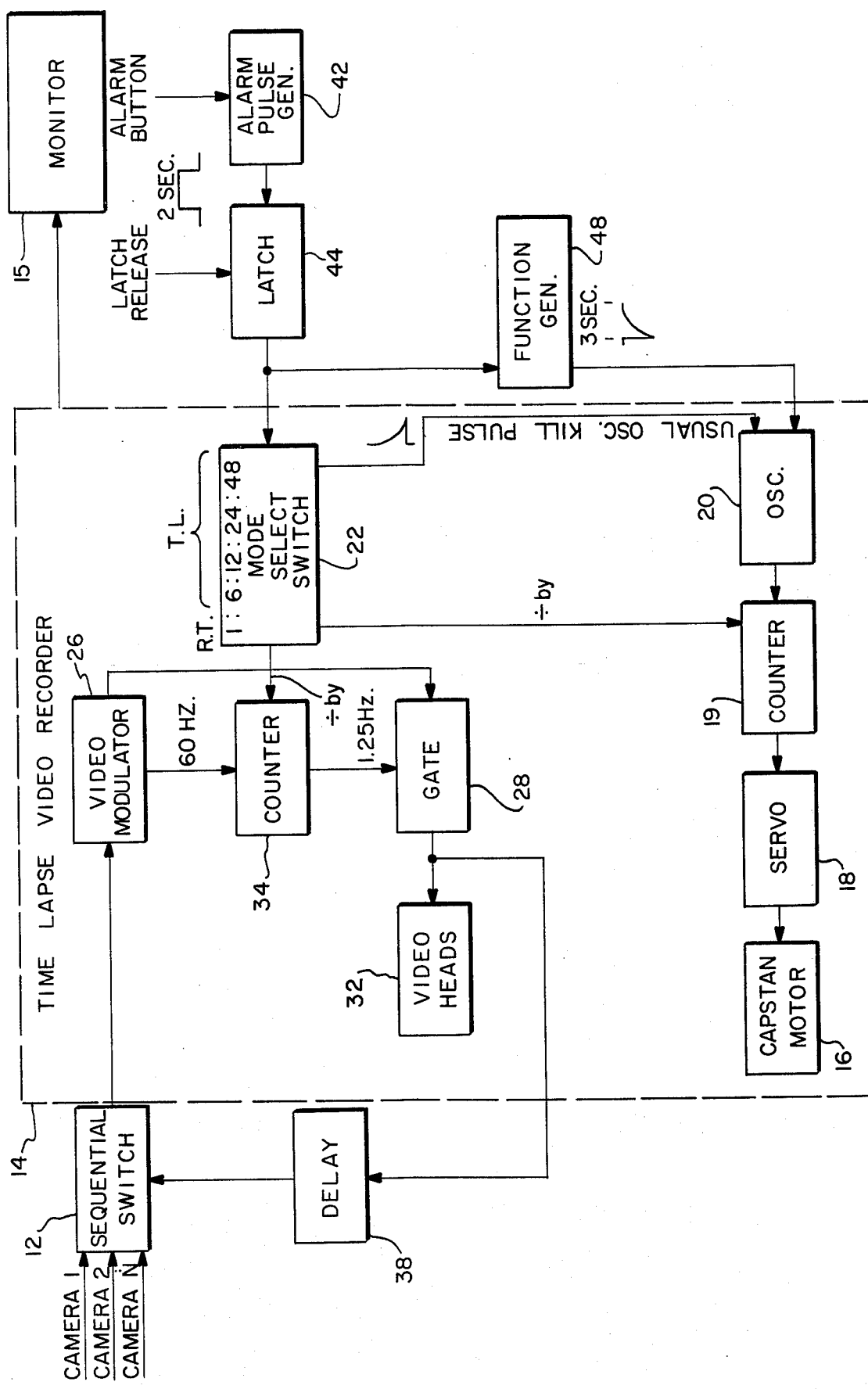

SWITCHED VIDEO RECORDING SYSTEM

BACKGROUND OF THE INVENTION

This invention relates to video surveillance systems. It relates more particularly to the recording of information from a plurality of television cameras in sequence so that occurrences at different locations can all be monitored quasi-continuously.

Many stores and banks position television cameras at several critical locations such as tellers' cages, vault areas, check cashing windows, etc. Pictures from all of these locations are displayed on television monitors or are recorded on video tape for later display in the event that they are to be subsequently reviewed. Thus, if there is a holdup or a bad check is passed, the recorded pictures may help identify the culprits.

A preferred system applies the video signals from a plurality of television cameras in sequence to the video tape recorder and associated television monitor. Normally, the cameras run continuously and the system operates unattended for many hours before tape replacement is required. A sequential video recording system such as this is sold by QSI Systems, Inc., West Newton, Massachusetts under its model designation 800. It is described in detail in copending application Ser. No. 535,989, mailed Dec. 17, 1974, entitled SEQUENTIAL VIDEO SWITCHING SYSTEM, which application is owned by the assignee of the present application.

When recording television pictures during a surveillance operation, it is desirable to employ a time-lapse recorder so that the system can operate for a long period without changing the video tape. However, when a time lapse recorder is used in conjunction with a sequential video recording system such as the one described in the above pending application, there is a drastic drop in the efficiency of the system and in the amount of useful information recorded on the video tape.

This drop in efficiency occurs because the system switches from one camera to another in the switching sequence at a random rate which the operator selects, depending upon the particular circumstances. However, at the same time, the time lapse recorder is recording frames from the television cameras at a gating rate that will minimize tape usage. If the sequential switching rate beween cameras is less than the gating rate of the time lapse recorder, information from the same television camera may be recorded twice, three, or even more times in a row during successive recorder gating intervals, so that the outputs of the other television cameras in the sequence which could contain critical information may not be recorded for a relatively long period of time.

On the other hand, if the sequential switching rate is faster than the gating rate of the time lapse recorder, the output of a particular camera in the sequence may not be recorded for a number of cycles in the switching sequence, again resulting in the loss of potentially important recorded information.

Also, when using a sequentially switched recording system, some small amount of information is lost during the actual switching operations. During an emergency situation, it would be highly desirable if even this small amount of data could be recorded so that there would be virtually no gaps in the information on the tape.

SUMMARY OF THE INVENTION

Accordingly, it is an object of the present invention to provide an efficient, reliable, sequentially switched time lapse video recording system.

Another object of the invention is to provide a recording system of this type which records a maximum amount of useful information on a given length of recording tape.

A further object of the invention is to provide a system of this general type whose television cameras contribute substantially equally to the information which the time lapse recorder records on the tape.

Yet another object of the invention is to provide such a system which switches automatically to a real time mode in an emergency situation.

A further object of the invention is to provide the aforementioned dual mode video recording system which switches between its time lapse and real time operating modes with minimum loss of potentially valuable information.

Other objects will in part be obvious and will in part appear hereinafter.

The invention accordingly comprises the features of construction, combination of elements and arrangement of parts which will be exemplified in the following detailed description, and the scope of the invention will be indicated in the claims.

In brief, the television signals from a plurality of television cameras are applied to a conventional time lapse recorder by way of a sequential switching system such as the one disclosed in the above application. The gating signal normally developed in the recorder to gate on the recorder's video heads when it is operating in a time lapse mode is also used to gate the sequential switching system. Consequently, the outputs of successive cameras in the switching sequence are applied to the recorder just as the recorder's heads are turned on. The output from each camera is applied to the recorder for a duration equivalent to one frame interval (i.e. 1/60 second) so that the outputs from all of the cameras in the sequence are recorded on the tape as successive picture frames.

Since the switching system which switches between cameras in synchronized with the recorder's video heads, duplicate frames from the same camera are not recorded on the tape. Furthermore, the outputs of all of the cameras are applied to the recorder on an equal time shared basis. Resultantly, the system records a maximum amount of useful information on a given length of tape.

Provision is also made in the present system for bypassing the recorder's manual mode select switch so that the recorder automatically switches to a real time recording mode whenever a central alarm is sounded. This helps to minimize the chances of potentially valuable pictures not being recorded during an emergency situation.

BRIEF DESCRIPTION OF THE DRAWING

For a fuller understanding of the nature and objects of the invention, reference should be had to the following detailed description taken in connection with the accompanying drawing which is a block diagram of a recording system embodying the principles of this invention.

DESCRIPTION OF THE PREFERRED EMBODIMENT

The present system uses a plurality of television cameras 1 to N whose video signals are applied to a sequential switching system 12 of the type described above sold by QSI Systems, Inc. The switching system, in turn, applies those video signals on a time-shared basis to the input of a conventional time lapse video recorder 14. A suitable recorder for this purpose is manufactured by Hitachi Electronics, Ltd., Tokyo, Japan under its Model No. SV-512U.

The pictures recorded on the tape by recorder 14 can then by displayed on a conventional television monitor 15. The recorder 14 employs a motorized capstan 16 driven by a servo system 18 to advance the video tape past the video heads 22. The servo is driven by output pulses from a counter 19 which counts pulses from an oscillator 20. The amount of the count is determined by the setting of the recorder's MODE SELECT switch 22. Switch 22 can be set to a real time (R.T.) position which causes the counter to emit one pulse for each pulse from oscillator 20 (i.e., ÷1) so that the tape advances at a high speed. It also has four time lapse (T.L.) positions to select the number of hours (i.e., 6:12:24:48) that the recorder will operate with a standard length of tape. Essentially, then, the counter divides by the switch setting so that the tape advances at selected speeds that will make the tape last for the selected number of hours before having to be replaced.

The video signals from the television cameras are actually applied to the recorder's video modulator circuit 26 and the modulated signals are coupled by way of a gating circuit 28 to the recorder's video heads 32. During the recording operation when the gating circuit 28 is enabled, the video heads record the incoming video signals on the tape.

The gating circuit 28 is enabled by pulses from a countdown counter 34 which counts vertical sync pulses separated from the incoming video signals in the recorder's modulator 26. The amount of the count by counter 34 is determined by the setting of switch 22 as described above. For example, if switch 22 is placed in its T.L. 48 position, counter 34 will emit a gating pulse each time it counts 48 sync pulses from the modulator 26. In other words, the gating pulses occur at a frequency of 60/48 or 1.25 Hz. Furthermore, the gating pulse has a duration corresponding to one television picture frame, i.e., 1/60 second. Thus, the video heads will record one television picture frame on the tape every 800 milliseconds.

When the recorder is recording thusly in its time lapse mode, the switchable oscillator is operating at a frequency such that the type advance is relatively slow, with the result that the video information corresponding to the successive television picture frames is situated close together on the recording tape and the tape will last 48 hours before having to be replaced.

When the recorder switch 22 is switched to its real time (R.T.) position, the counter 19 generates higher frequency pulses which advance the tape past the heads at a faster rate so that the tape will only last one hour. Also, the recorder's gating circuit 28 is enabled continuously so that the video modulator 26 output is applied continuously to the video heads 32. Resultantly, the recorder 14 records incoming video information substantially continuously on the tape, i.e., 48 picture frames every 800 milliseconds.

In accordance with this invention, the sequential switch 12 used to apply the outputs of the television cameras 1 to N to the time lapse recorder 14 on a time-shared basis is enabled by the very same signal that gates the video heads in the recorder itself. More particularly, the output pulses from the recorder's gate 28 are applied by way of a delay circuit 38 to gate the sequential switch 12.

More specifically, the delayed pulses are applied as synchronizing pulses to the multivibrator in the sequencing section of that switch 12 in lieu of the vertical sync pulses from the television cameras as described in the aforesaid application. The delay circuit delays and buffers the recorder's usual gating pulse to allow the tape recorder servo system 18 the full switching period to settle on the new camera in the sequence before being asked to record the video output from that camera. This helps to prevent noise from entering the recording process and spoiling the quality of the recorded pictures.

Thus, with switch 22 positioned at T.L. 48, the output of camera 1 is recorded for one frame interval (e.g. 1/60 second or 16.6 milliseconds). After a time interval somewhat greater than 16.6 milliseconds, a delayed output pulse from gate 28 switches the camera 2 output to the recorder. After a subsequent interval of up to 783.4 milliseconds, the output camera 2 is recorded for one frame interval. Resultantly, the outputs of all of the cameras are recorded on the tape as successive picture frames.

During playback, these successive frames can be displayed on monitor 15.

Provision is made in the present system for switching the recorder 14 to its real time mode automatically in the event an emergency occurs, even though its mode select switch 22 is in a time lapse (T.L.) position. More particularly, if the installation's silent alarm is activated by someone depressing a silent alarm button, this triggers an alarm pulse generator 42. Generator 42 thereupon applies a large current pulse of relatively long duration, e.g. 2 seconds, to a solenoid latch 44 which is mechanically connected to switch 22 so as to essentially reset the switch to its R.T. position, thereby causing counters 19 and 34 to divide by one. Thus, the recorder switches immediately to its real time mode so that its video heads record substantially continuously while the tape is advanced at its fast rate as described above.

As usual with recorders or this type which use a step type capstan motor, when switch 22 is switched from one position to another, a sharp negative pulse which thereupon rises expotentially is applied to oscillator 20. This shuts off the oscillator and then allows its frequency to rise slowly over a period of about 3 seconds so that the step motor can change speed without stalling.

Since the present system switches automatically to its real time mode when the remote alarm button is depressed, and without the operator touching switch 22, a function generator 48 is provided which is triggered when switch 22 is reset to its R.T. position by latch 44. Generator 48 can be any suitable transistor switch-capacitor combination which will produce the illustrated expotential waveform that will kill oscillator 16 and then allow its frequency to rise slowly.

The system will record continuously until the operator actuates the latch release whereupon the system will resume elapsed time operation, assuming, of course, that switch 22 is still in its T.L. position. The closing of latch 44 can also be used to turn on an audio channel connecting microphones (not shown) situated at the camera locations to the recorder 14 so that sounds as well as pictures are recorded during the emergency.

Thus, the aforesaid recording system which time shares the output from several television cameras to a single time lapse recorder so as to synchronize switching of the camera outputs to the gating of the recorder video heads should greatly increase recording efficiency. All of the cameras are time-shared equally so that there are no duplicate picture frames recorded on the tape and no appreciable gaps in the information provided by any of the cameras. This not only helps to minimize the chances of important information not being recorded, but also makes the most efficient use of a given length of video tape.

If and when an emergency situation does occur, the present system automatically switches to its continuously recording mode with full audio when the central alarm button is actuated. It remains in this mode until the emergency situation has passed and the system is reset manually to its elapsed time mode. Accordingly, the system should be a valuable addition to the repertoire of presently available surveillance tools.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:
1. In combination,
   A. a video recorder of a type having a real time operating mode wherein the video input to the recorder is applied continuously to the recorder video heads and the video tape is advanced at a selected relatively high speed and a time lapse operating mode in which the video input to the recorder is applied intermittently to the video recording heads when the heads are turned on by a video head gating signal and the tape is advanced at a selected relatively low speed and wherein the mode of the operation is selected by a manually operated mode select switch,
   B. a plurality of television cameras, each producing an output signal,
   C. a sequential switch connected between the television cameras and the recorder, said switch switching between the camera output signals on receipt of a switching signal so as to apply the output signals from the television cameras to the recorder on a time-shared basis, and
   D. means for deriving the switching signals from the video head gating signals developed in the recorder, said deriving means delaying each switching signal so that it occurs after the end of the gating signal from which it is derived, whereby the recorder records the pictures from the cameras as a repetitive series of frames on the recording tape and whereby the switch settles on each camera output signal in the sequence during the time that the head is turned off after the recorder has recorded the previous video signal pursuant to the head gating signal from which the switching signal was derived.
2. The system defined in claim 1 and further including means for delaying the switching signal applied to the switch so that the tape recorder settles on each camera output signal in the sequence before being required to record that output signal.
3. The system defined in claim 1 and further including
   A. means for generating an alarm signal, and
   B. means responsive to the alarm signal for resetting the manual mode select switch on the recorder so that the recorder automatically assumes its real time mode of operation.
4. The system defined in claim 3
   A. wherein the tape is advanced by a step motor-type capstan, and
   B. further including
      1 an oscillator whose frequency controls the speed of the motor, and
      2 a function generator connected to turn off the oscillator and then allow its frequency to rise slowly when the select switch is reset automatically by the latch, whereby the motor can change speed without stalling.
5. In combination,
   A. a video recorder of a type having a real time operating mode wherein the video input to the recorder is applied continuously to the recorder video heads and the video tape is advanced at a selected relatively high speed and a time lapse operating mode in which the video input to the recorder is applied intermittently to the video recording heads when the heads are turned on by a video head gating signal and the tape is advanced at a selected relatively low speed and wherein the mode of the operation is selected by a manually operated mode select switch,
   B. a plurality of television cameras, each producing an output signal,
   C. a sequential switch connected between the television cameras and the recorder, said switch switching between the camera output signals on receipt of a switching signal so as to apply the output signals from the television cameras to the recorder on a time-shared basis,
   D. means for deriving the switching signals from the video head gating signals developed in the recorder, said deriving means delaying each switching signal so that it occurs after the end of the gating signal from which it is derived, whereby the recorder records the picture from the cameras as a repetitive series of frames on the recording tape and whereby the switch settles on each camera output signal in sequence during the time that the head is turned off after the recorder has recorded the previous video signal pursuant to the head gating signal from which the switching signal was derived,
   E. tape advance means including a step motor-type capstan,
   F. an oscillator whose frequency controls the speed of the motor, and
   G. a function generator connected to turn off the oscillator and then allow its frequency to rise slowly when the select switch is reset automatically by the latch, whereby the motor can change speed without stalling.

6. The system defined in claim 5 and further including
   A. means for generating an alarm signal, and
   B. means responsive to the alarm signal for resetting the manual mode select switch on the recorder so that the recorder automatically assumes its real time mode of operation.

* * * * *